United States Patent
Sangston

(10) Patent No.: US 12,427,420 B2
(45) Date of Patent: Sep. 30, 2025

(54) RENDERING AMBISONICS SOUND SOURCES USING FRACTIONAL ORDERS

(71) Applicant: Sony Interactive Entertainment Inc., Tokyo (JP)

(72) Inventor: Brandon Sangston, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 267 days.

(21) Appl. No.: 18/296,287

(22) Filed: Apr. 5, 2023

(65) Prior Publication Data

US 2024/0335751 A1    Oct. 10, 2024

(51) Int. Cl.
A63F 13/54    (2014.01)

(52) U.S. Cl.
CPC ...... *A63F 13/54* (2014.09); *A63F 2300/8082* (2013.01)

(58) Field of Classification Search
CPC .......................... A63F 13/54; A63F 2300/8082
See application file for complete search history.

(56) References Cited

U.S. PATENT DOCUMENTS

| | | |
|---|---|---|
| 2017/0070840 A1 | 3/2017 | Kordon et al. |
| 2018/0227665 A1 | 8/2018 | Elko et al. |
| 2019/0069110 A1* | 2/2019 | Gorzel ................. H04S 3/00 |
| 2019/0313200 A1 | 10/2019 | Stein |
| 2020/0021939 A1* | 1/2020 | Oland ................. H04R 5/04 |
| 2023/0224659 A1* | 7/2023 | Yoo ................. H04S 3/002 381/2 |
| 2024/0276172 A1* | 8/2024 | Allen ................. G10K 15/12 |

OTHER PUBLICATIONS

"International Search Report and Written Opinion", dated Aug. 8, 2024, from the counterpart PCT application PCT/US24/23141.
Gorzel et al., "Efficient Encoding and Decoding of Binaural Sound with Resonance Audio", Presented at the Conference on Immersive and Interactive Audio, Mar. 27-29, 2019, York, UK.
Zotter et al., "Ambisonics: A Practical 3D Audio Theory for Recording, Studio Production, Sound Reinforcement, and Virtual Reality", Springer Topics in Signal Processing, 2019.
F. Zotter, M. Frank, Ambisonic decoding with panning-invariant loudness on small layouts (AIIRAD2), in 144th AES Convention, prepr. 9943 (Milano, 2018).

(Continued)

*Primary Examiner* — James S. McClellan
(74) *Attorney, Agent, or Firm* — Kilpatrick Townsend & Stockton LLP

(57) ABSTRACT

Ambisonics audio such as may be used for computer simulations such as computer games is improved by improving the emulated spread of a sound source. A demanded spread for a sound object of a computer game is received, and using the spread one or more fractional Ambisonics orders are determined. Weights such as max-rE weights are derived for the fractional Ambisonics order using polynomial interpolation. An Ambisonics representation of the sound object is encoded using the weights for the fractional Ambisonics order for providing the sound object to an Ambisonics decoder to decode and play the sound object.

19 Claims, 9 Drawing Sheets

(56) References Cited

OTHER PUBLICATIONS

Gorzel, M, Allen, A, et. al. Efficient Encoding and Decoding of Binaural Sound with Resonance Audio. AES Conference on Immersive and Interactive Audio, York, UK, Mar. 27 -29, 2019.
Zotter, Franz & Frank, Matthias. (2012). All-Round Ambisonic Panning and Decoding—Abstract. Journal of the Audio Engineering Society. 60. https://www.semanticscholar.org/paper/All-Round-Ambisonic-Panning-and-Decoding-Zotter-Frank/33659c7767b9a44fe392ddb91dab8ec429b81b02.

* cited by examiner

RENDERING AMBISONICS SOUND SOURCES USING FRACTIONAL ORDERS

FIELD

The present application relates generally to rendering ambisonics sound sources using fractional orders.

BACKGROUND

Ambisonics is a method for recording, mixing, and playing back three-dimensional 360-degree audio. It is particularly advantageous in virtual reality (VR) applications, which require 360° audio solutions. The basic approach of Ambisonics is to treat an audio scene as a full 360-degree sphere of sound coming from different directions around a center point. The spatial sound field is projected into spherical harmonics, essentially overlapping spheres or "sound fields" the number and resultant shapes of which depend on the order of the Ambisonics being used. The center point of the spatial sound field is where the microphone is placed while recording, or where the listener's 'sweet spot' is located while playing back. Note that Ambisonics works not just with microphone recording but also as a synthesized technique for existing audio files such as may be generated for a computer simulation such as a computer game. Note that the chosen Ambisonics order directly affects the spatial resolution of the representation. Lower orders blur or spread the sound out more than higher orders (Order~Spatial Resolution). Ambisonics is an intermediate "encoded" representation that is output-agnostic. To listen to an Ambisonics soundfield, it must be "decoded" to some listening configuration (speakers, headphones, etc.).

SUMMARY

As recognized herein, which Ambisonics order is selected relates to the perceptual sound spread from a sound object or source. However, absent present principles, Ambisonics is limited to discrete polynomial orders. Present principles create a mapping function to encode fractional Ambisonics orders to more closely approximate the demanded spread of a sound object.

Accordingly, an apparatus such as an encoder includes at least one processor configured with instructions which are executable to identify a spread for a sound object of a computer game. The instructions are executable to determine from the spread at least one fractional Ambisonics order, and use polynomial interpolation to derive weights for the fractional Ambisonics order. The instructions are executable to encode the sound object using the weights for the fractional Ambisonics order for providing the sound object to an Ambisonics decoder to decode and play the sound object.

In example embodiments the weights can include one or more of max-rE weights, in-phase weights, and half-hann weights. The fractional Ambisonics order may be between $0^{th}$ and $5^{th}$ order Ambisonics.

In some implementations the instructions can be executable to derive plural fractional weights interpolated between unweighted Ambisonics and fully weighted Ambisonics.

In specific examples the instructions can be executable to determine the fractional Ambisonics order by taking the square root of $4\pi/\theta$ minus 1, wherein $\theta$ is the spread.

In example embodiments described herein the instructions may be executable to multiply the weights with respective components of each Ambisonics order in the spherical harmonics domain. If desired, spline interpolation may be executed at end regions of a polynomial representing the fractional Ambisonics order.

In another aspect, an apparatus such as a decoder includes at least one processor programmed with instructions to receive at least one fractional Ambisonics order representing at least one sound object, and execute at least one of All-Round Ambisonics Decoding (AllRAD) or All-Round Ambisonics Panning (AllRAP) to play the sound object on at least one speaker with a spread represented by the fractional Ambisonics order.

In some implementations, Vector-Based Amplitude Panning (VBAP) also may be used to render the sound object. In example embodiments, the sound object can include a first, relatively more important sound object in a computer game and the instructions can be executable to execute only VBAP to render a second, less important sound object in the computer game.

In some embodiments, VBAP may be used in combination with Ambisonics, wherein sound objects at low or zero spreads (point-sources) are rendered using VBAP and Ambisonics is used to render sound objects with increasing spread.

In another aspect, a method includes identifying plural Ambisonics orders, and for each Ambisonics order, solving a polynomial that interpolates known weights for integer orders on either side of a non-integer order to render interpolated weights. The method includes using at least the interpolated weights to encode at least one sound object.

The details of the present application, both as to its structure and operation, can be best understood in reference to the accompanying drawings, in which like reference numerals refer to like parts, and in which:

DETAILED DESCRIPTION

Figure 1:
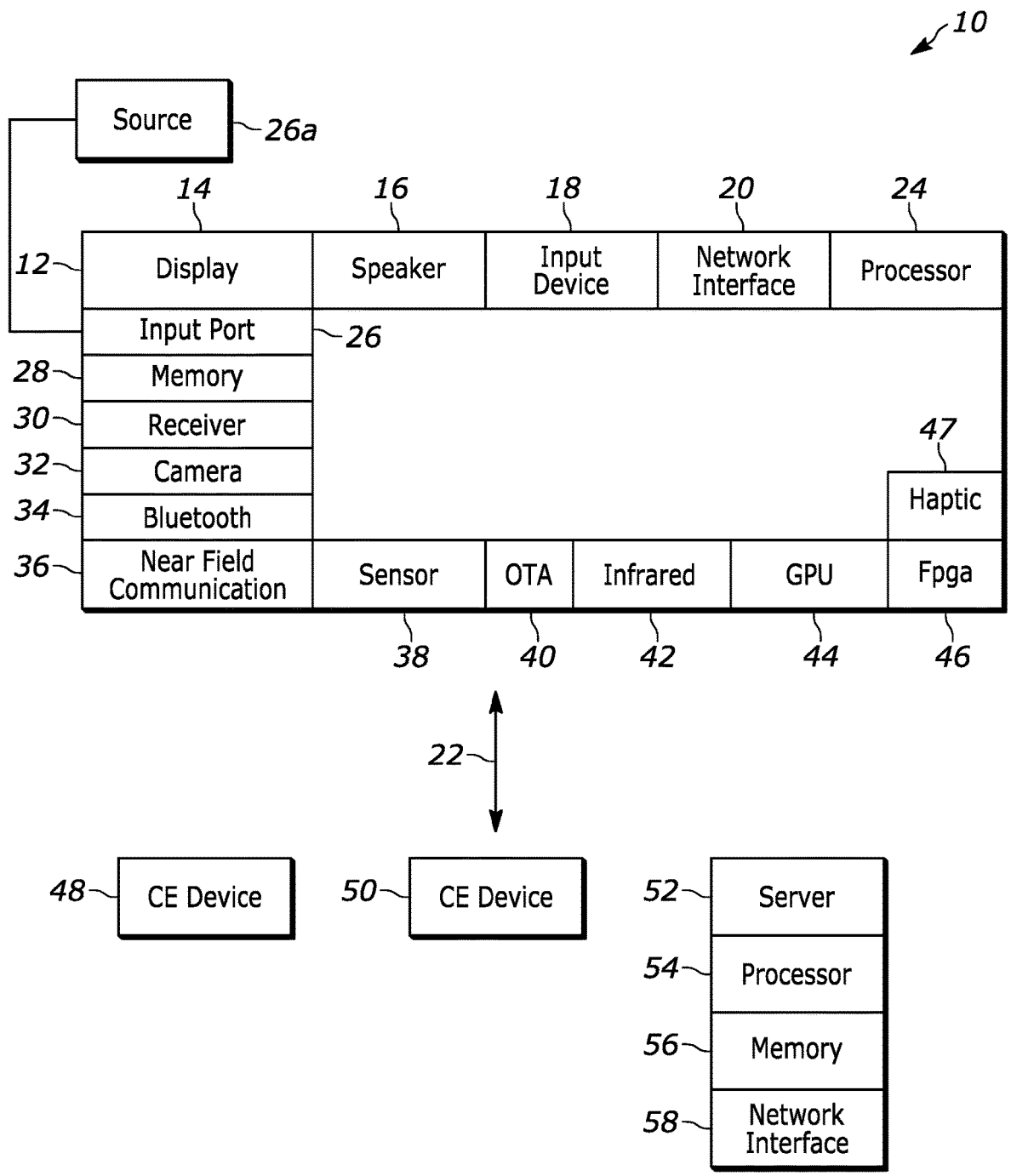
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

The components and techniques below may be implemented by any one or more of the devices and components described herein.

Prior to turning to the remaining figures, in Ambisonics, an infinite series of polynomials defining a sound field is truncated to a highest polynomial order, such as five for example, with less truncation resulting in higher fidelity. Typically, a decoder receives a mix of Ambisonics orders. As an example, a game developer might be targeting a maximum of fifth order Ambisonics, which is 36 channels of audio data. Within the fifth order Ambisonics mix might also be contained first order Ambisonics content (first four channels), or third order Ambisonics content (first 16 channels). There will still be 36 channels of content total (fifth order Ambisonics), but the audio signals from each subset order (first, third, etc.) will be mixed/summed together.

Figure 2:
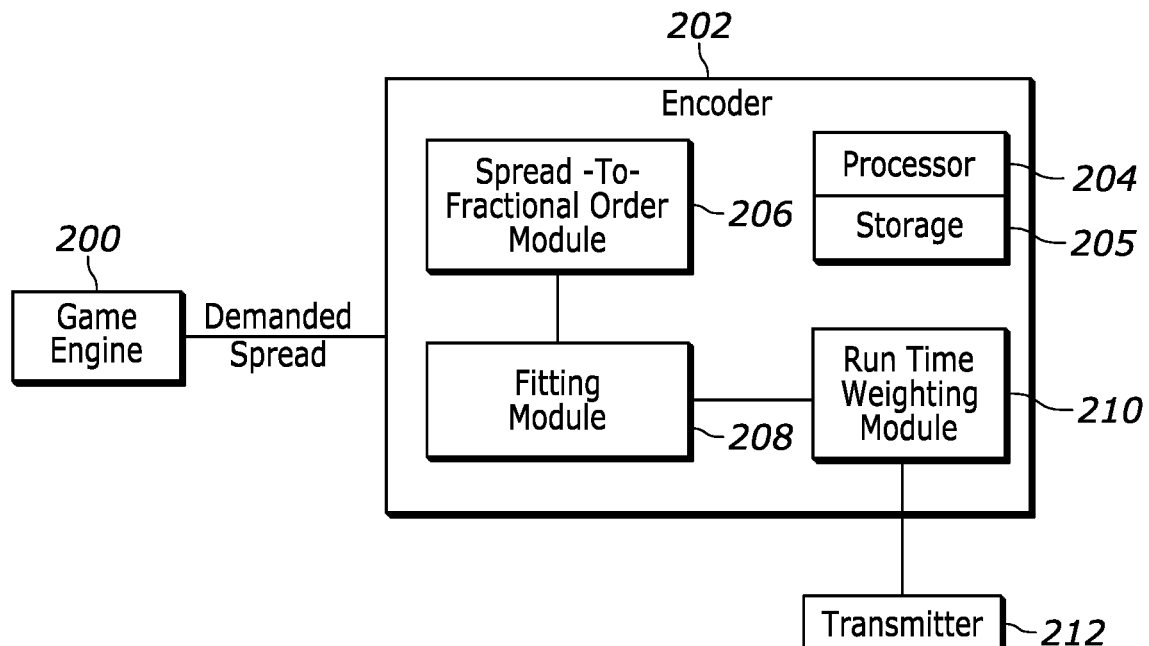
FIG. 2 illustrates an example encoder for an encore-side technique.

Turn now to FIG. 2 for an example of an encoder for an encode-side solution. A sound generator 200 such as a microphone or a computer game engine sends sounds to be encoded to an Ambisonics encoder 202. The sounds include not only the position, nature, and character of a demanded sound but also a demanded angular spread for the sound. One or more processors 204 access one or more computer storage media 205 to execute instructions embodied in a spread-to-fractional order module 206, which determines a fractional Ambisonics order based on the demanded spread. The output of the module 206 is sent to a fitting module 208 to determine weights for the fractional order, which are applied to the encoded sound at run time by a weighting module 210 and sent to one or more receivers through a wired or wireless transmitter 212.

Figure 3:
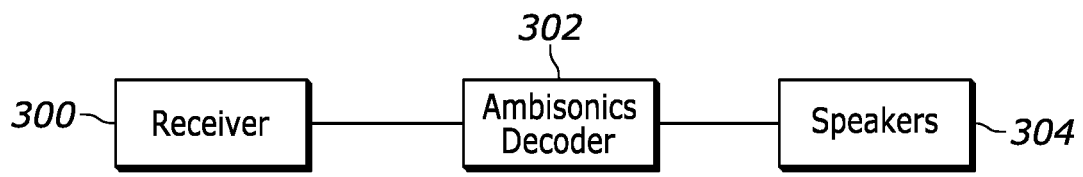
FIG. 3 illustrates an example decoder for a decode-side technique.

In FIG. 3, the encoded Ambisonics sound objects are received by a receiver 300 and provided to an Ambisonics decoder 302 for decoding the Ambisonics and playing the sound objects on one or more speakers 304. In one particular use case, a speaker system of 7.1.4 is targeted, though because Ambisonics encoding is used, this solution is generic to any speaker layout (5.1, 7.1, etc.) or even binaural rendering.

As used herein, panning refers to the distribution of an audio signal into a new multi-channel sound field (1→N). Present principles are primarily concerned with 3D panning, whereby the position of a sound source is used to calculate a set of volumes/gains to distribute the sound to the new channels. These channels can be literal loudspeaker channels, Ambisonics channels, binaural, etc.

Vector-Based Amplitude Panning (VBAP) may be used as a 3D speaker panning technique which uses a triangular mesh of loudspeakers. Given a set of loudspeakers and sound source position, VBAP finds the "active triangle" and distributes the sound to the loudspeakers corresponding to that triangle. If the sound is positioned directly on a loudspeaker, it will be mixed only to that one speaker. If it is located on an edge connecting to speakers, it will be mixed to those two speakers. Or, if it is in an arbitrary position between speakers, it will be mixed to up to three speakers representing the vertices of the triangle. VBAP by itself however provides point-source panning, whereas present principles seek to represent sounds that have a perceptual spread/size. As understood herein, simply performing a linear crossfade between the point-source VBAP coefficients and a set of coefficients that equally distributes the signal to all speakers provides a low quality representation of spread. And, performance implications render impractical performing VBAP on many virtual sources at distributed positions, and then accumulating the results.

All-Round Ambisonics Decoding (AllRAD) may be used for encoding and decoding. AllRAD uses VBAP in an intermediate stage to produce a higher quality Ambisonics decode onto arbitrary speaker locations. All-Round Ambisonics Panning (AllRAP) on the other hand is like AllRAP except that instead of encoding sounds to a separate Ambisonics soundfield, the encode/decode operations in AllRAP are combined into a single panning function. This is useful when the output format is known in advance and the intermediate Ambisonics soundfield is not needed. This is the approach taken in example embodiments in which the output is known beforehand and is mathematically equivalent the separated encode/decode approach with AllRAD. However, AllRAD also may be used.

By moving away from VBAP-based spread and leveraging the implicit spread of order-truncated Ambisonics, present principles provide a technique for performing a meaningful mapping of angular spread into the Ambisonics domain. Given a source with a defined position and spread, the sound source is encoded into a fractional Ambisonics order that spreads the sound by the desired amount. The maximum order (e.g., 5th) dictates the minimum possible spread angle. This can be arbitrarily scaled up to higher Ambisonics orders, but there are diminishing returns. 5th order has been found to represent a good tradeoff between performance and quality.

As mentioned above, present principles may employ AllRAP for panning, but it can also be used to generate an Ambisonics soundfield which could then be decoded later to a different format (7.1, 7.1.4, binaural, etc.). Present techniques essentially convert the desired angular spread into a fractional Ambisonics order and provide a smooth interpolation across the range of spread/Ambisonic orders using interpolated weights such as Max-rE weights.

Figure 4:
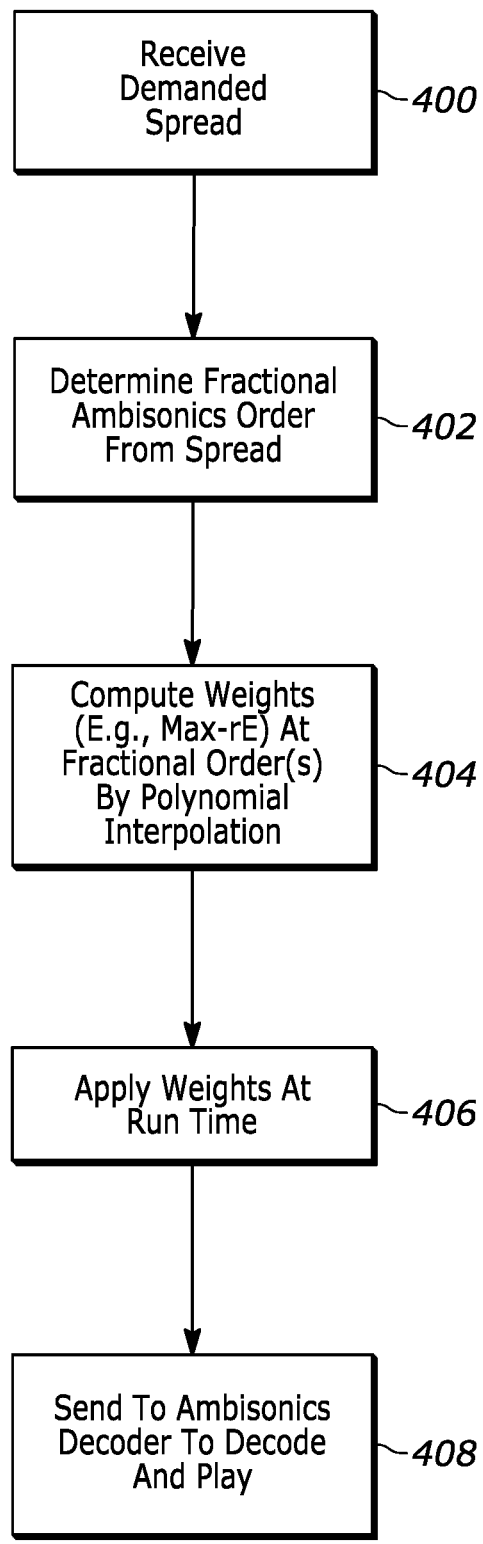
FIG. 4 illustrates example overall logic in example flow chart format.

Accordingly, refer now to FIG. 4. A demanded sound field spread of a sound object is identified at state 400, typically received along with the sound object itself. Proceeding to state 402, one or more fractional Ambisonics orders are determined, e.g., by the spread-to-fractional order module 206 in FIG. 2, as further set forth below from the demanded spread. By "fractional" is meant an order between two immediately numerically adjacent integer Ambisonics orders.

State 404 indicates that weights are computed for the fractional order(s) determined at block 402, e.g., by the fitting module 208 in FIG. 2. Max-rE weights may be used, and/or other weights such as in-phase and half-hann weights may be used. The weights are applied at state 406 at runtime, e.g., by the run time weighting module 210 in FIG. 2. Weights are applied at runtime by scaling the components of each Ambisonics order with its associated weight. The encoded Ambisonics is sent at state 408 to one or more Ambisonics decoders to decode and play the sound object.

Note that AllRAD may be used in embodiments to encode sound source(s) to an Ambisonics soundfield which may be consumed by an arbitrary decoder later (decoder could be 7.1, 7.1.4, binaural, etc.) On the other hand, AllRAP may be used in embodiments in which the output speaker configuration is known in advance, so that the intermediate soundfield representation can be skipped and the "encode/decode" operations are performed as a singular panning function. In either case, the interpolated max-rE weights are applied at runtime to the Ambisonics encoding coefficients (spherical harmonics evaluated in the direction of the sound object). The practical difference in implementation is that in the AllRAP case the Ambisonics coefficients are not applied to encode the audio data directly, but rather as an intermediate calculation in a fixed speaker panning function. The decoder reverses the encoding.

Figure 5:
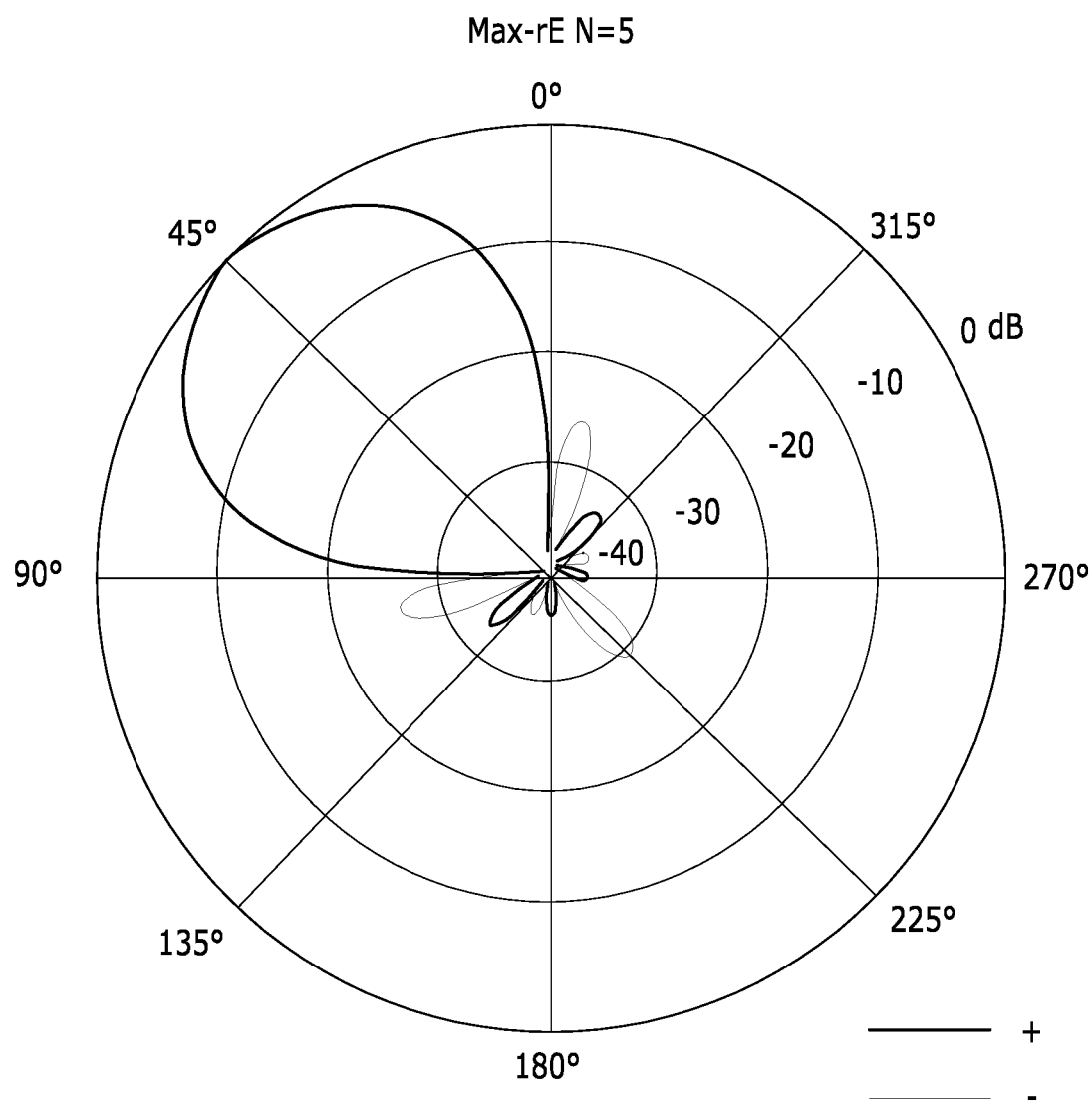
FIG. 5 illustrates example multi-order Ambisonics sound fields.

FIG. 5 is provided to illustrate the shape of an Ambisonics encoding weighted using Max-rE for a fifth order Ambisonics, it being understood that fractional orders will have a similar appearance.

Figure 9:
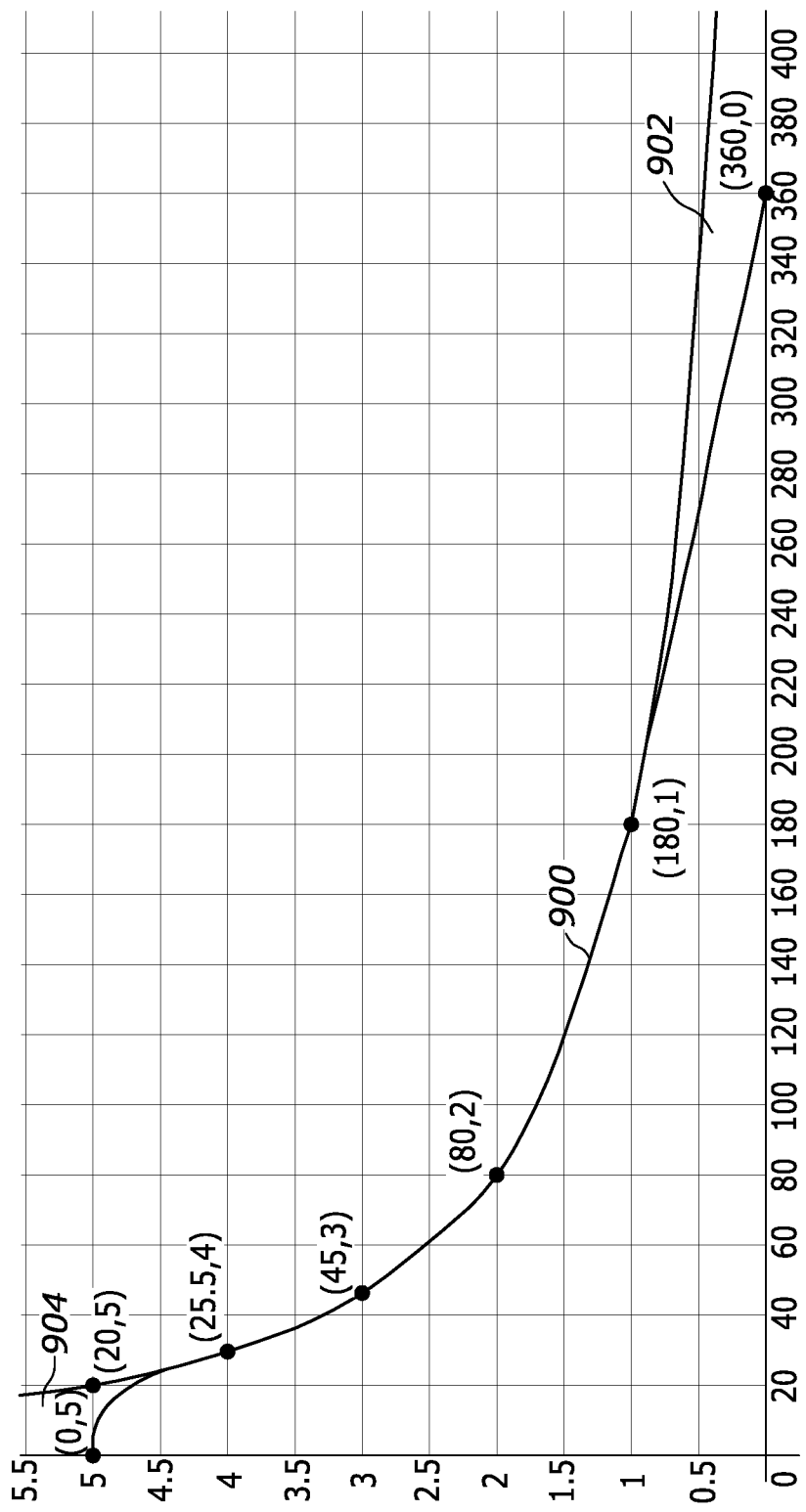
FIG. 9 illustrates spline interpolation at end points of a polynomial.

The fractional Ambisonics order "N" can be derived at state 402 in one non-limiting example by the function N=square root of $4\pi/\theta$ minus 1, wherein $\theta$ is the demanded angular spread in radians. Briefly referring to FIG. 9, this fractional order is represented by the function 900 in FIG. 9, in which spline interpolation may be used to handle the endpoints 902, 904. In FIG. 9, the X-axis of the plot represents spread (degrees), and the Y axis represents the fractional Ambisonics order. Note that whether degrees or radians is used in FIG. 9 is used to more clearly see the function.

Figure 6:
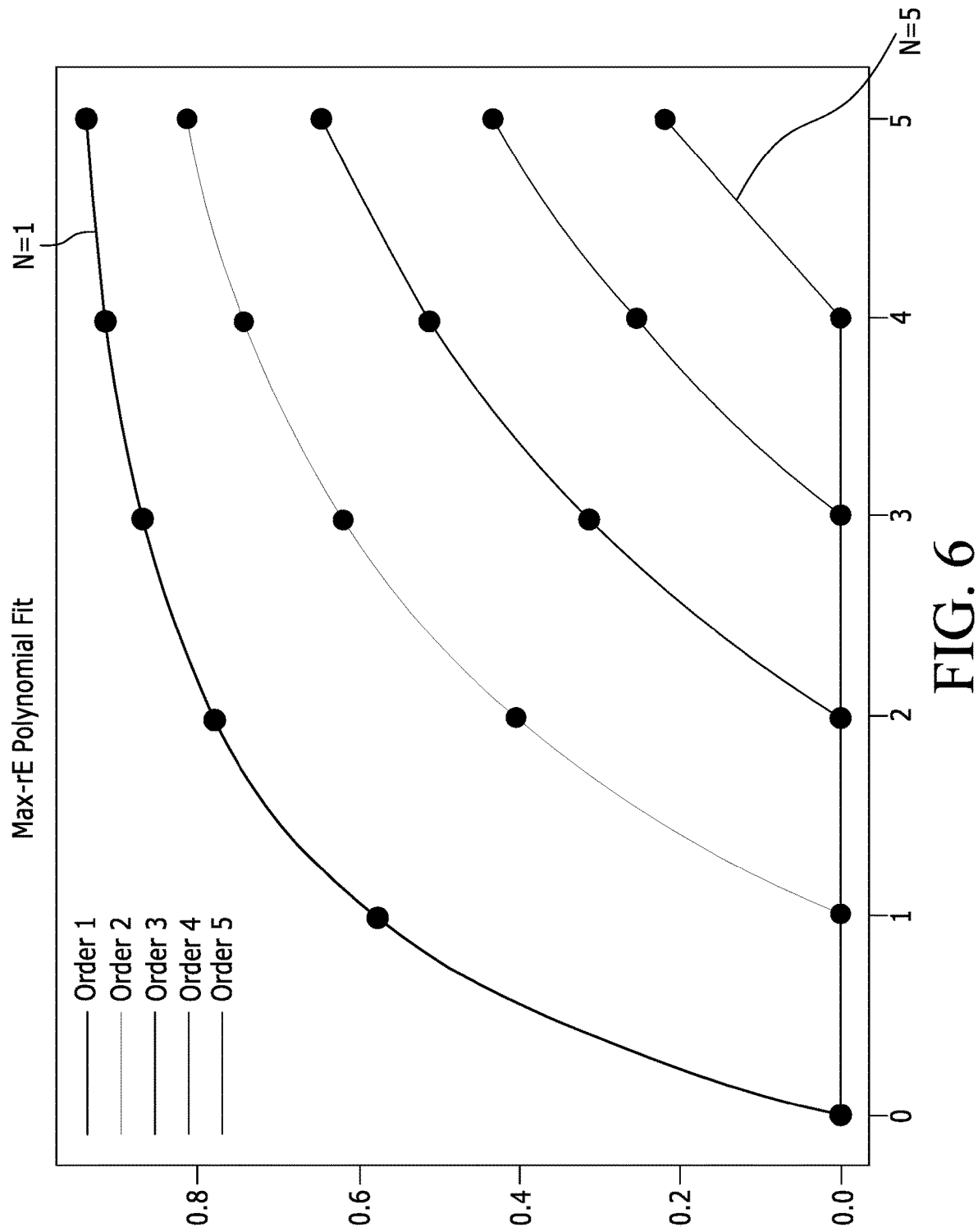
FIGS. 6 and 7 are graphs illustrating example polynomial fitting.

Referring back to FIG. 4, to provide a suitable mapping onto spread at state 404, a set of functions may be used to compute weights such as max-rE weights. FIG. 6 illustrates the polynomial fits for fifth order Ambisonics from order 1 through 5. In FIG. 6, the x-axis represents the fractional Ambisonics order N, and the Y axis represents the value of the Max-rE coefficients for the associated order.

Figure 7:
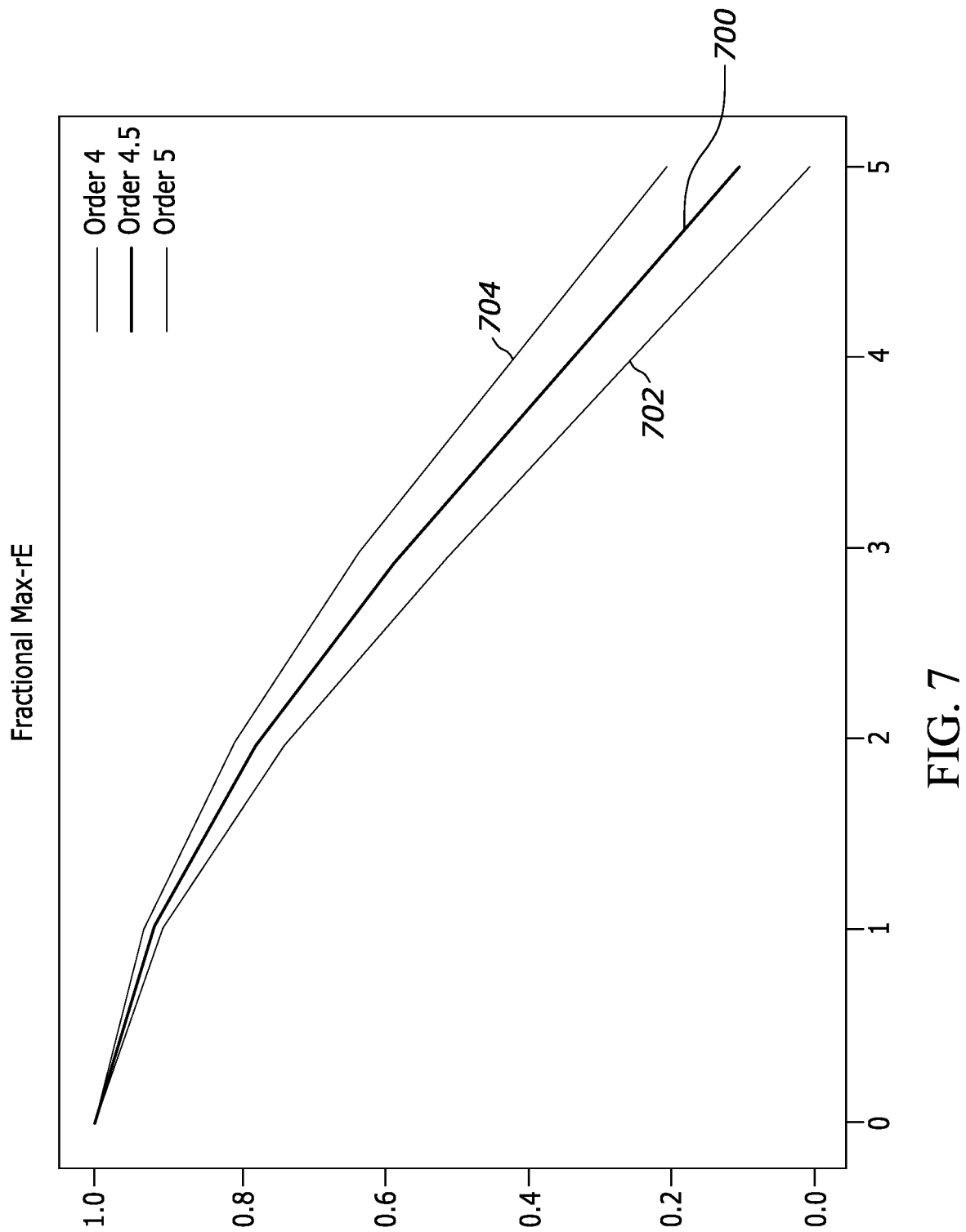

FIG. 7 illustrates a polynomial mapping for a fractional order 4.5 (at 700 in FIG. 7) that is constructed to be halfway between the polynomial functions for order 4 and 5 (respectively at 702, 704). Thus, the function 700 can be computed via simple polynomial interpolation. Max-rE weights can be interpolated for any fractional order. They are applied in the spherical harmonics domain as a weight to be multiplied with the components of each Ambisonics order.

Figure 8:
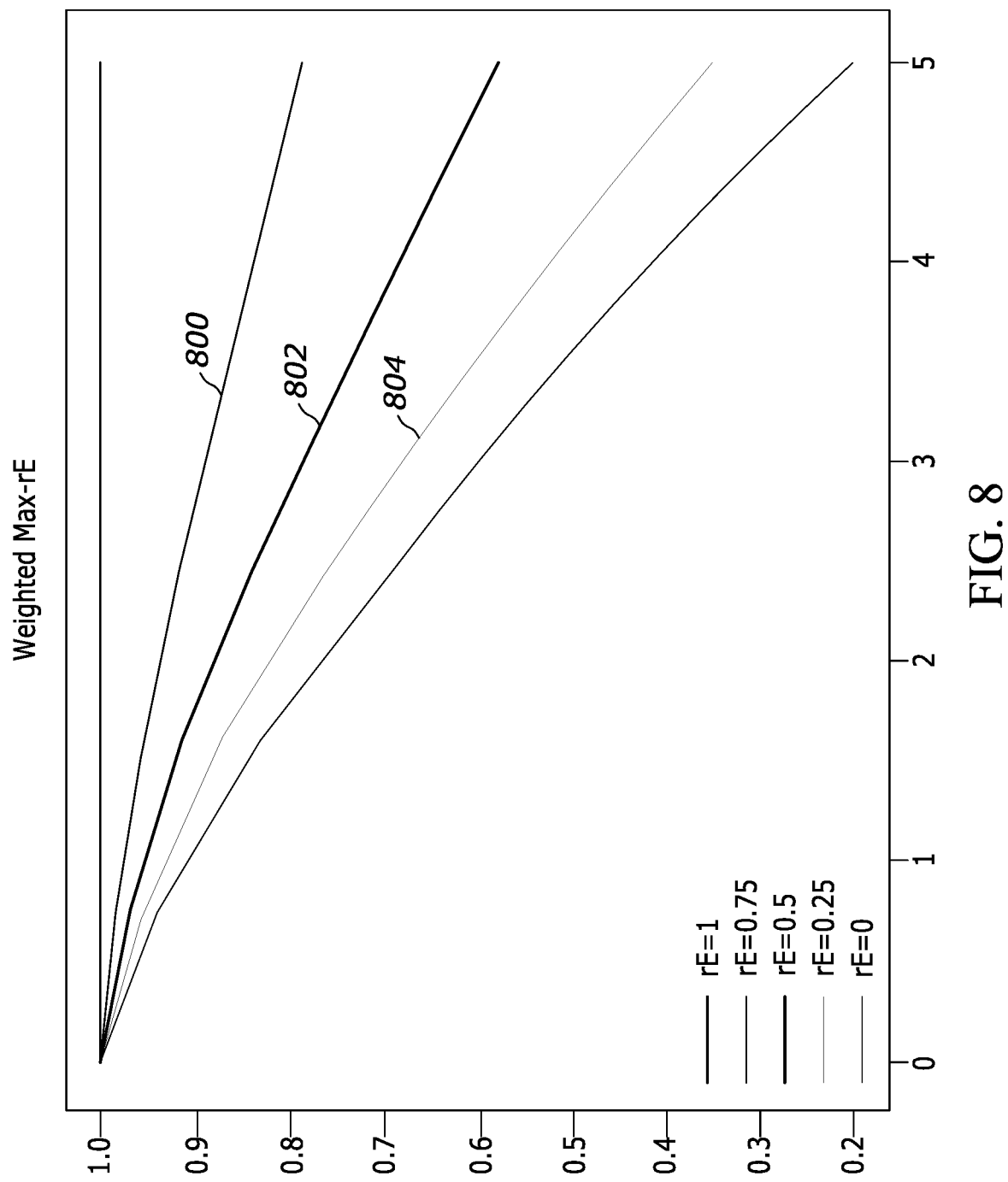
FIG. 8 illustrates weight interpolation.

It is to be understood that for each Ambisonics order, a polynomial is solved for that interpolates the known max-rE weights for the integer orders on either side of the fractional order. FIG. 8 illustrates this further, showing that plural fractional weights 800, 802, 804 are interpolated between weight 1 and weight zero. That is, interpolation may be conducted between unweighted Ambisonics and full max-rE for additional control over Ambisonics panning behavior.

In any case, a series of polynomials associated with the components of each Ambisonics order is used to determine the fractional order weights. The Max-rE weights are a set of coefficients for each Ambisonics order. In the case of fifth order Ambisonics, a vector W contains N+1=6 elements. For example, A[0] is 0th order, A[1] . . . . A[3] is 1st order, A[4] . . . [8] is 2nd order, A[9] . . . . A[15] is 3rd order, etc. To apply the weights, the orders are multiplied with the associated Ambisonics components: A[0]*W[0], A[1] . . . [3]*W[1], A[4] . . . A[8]*W[2], etc.

Figure 10:
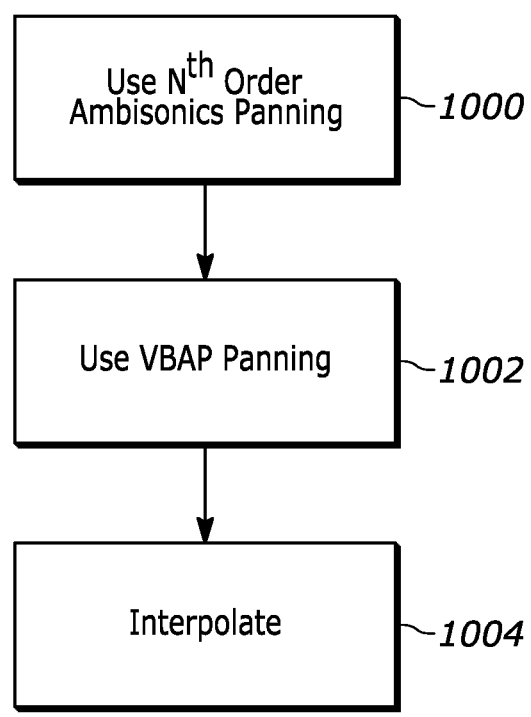
FIG. 10 is a flow chart of example logic.

In an alternate technique first order Ambisonics+VBAP can be used, which is essentially the same as the process described above with one addition. Instead of exclusively using Ambisonics panning at state 1000 of FIG. 10, VBAP panning at low spread values is also used at state 1002 and interpolated with the Ambisonics panning result at state 1004. This facilitates retention of point-source VBAP panning at 0 spread while still having the advantage of Ambisonics panning for representing spread. First order Ambisonics may be used for this hybrid approach but it is to be understood that any order of Ambisonics may be used.

In some implementations high-priority sounds can use the Ambisonics techniques described herein while low priority sounds can use the lower quality and less expensive VBAP-only approach.

While the particular embodiments are herein shown and described in detail, it is to be understood that the subject matter which is encompassed by the present invention is limited only by the claims.

What is claimed is:

1. An apparatus comprising:
   at least one processor configured with instructions which are executable to:
   identify a spread for a sound object of a computer game;
   determine from the spread at least one fractional Ambisonics order;
   use polynomial interpolation to derive weights for the fractional Ambisonics order;
   multiply the weights with respective components of each Ambisonics order in the spherical harmonics domain; and
   encode the sound object using the weights for the fractional Ambisonics order for providing the sound object to an Ambisonics decoder to decode and play the sound object.

2. The apparatus of claim 1, wherein the weights comprise max-rE weights.

3. The apparatus of claim 1, wherein the weights comprise in-phase weights.

4. The apparatus of claim 1, wherein the weights comprise half-hann weights.

5. The apparatus of claim 1, wherein the fractional Ambisonics order is between $0^{th}$ and $5^{th}$ order Ambisonics.

6. The apparatus of claim 1, wherein the instructions are executable to derive plural fractional weights interpolated between unweighted Ambisonics and fully weighted Ambisonics.

7. The apparatus of claim 1, wherein the instructions are executable to determine the fractional Ambisonics order by taking the square root of $4\pi/\theta$ minus 1, wherein $\theta$ is the spread.

8. The apparatus of claim 7, wherein the instructions are executable to:
   execute spline interpolation at end regions of a polynomial representing the fractional Ambisonics order.

9. An apparatus comprising:
   at least one processor programmed with instructions to:
   receive at least one fractional Ambisonics order representing at least one sound object; and
   execute at least one of All-Round Ambisonics Decoding (AllRAD) or All-Round Ambisonics Panning (AllRAP) to play the sound object on at least one speaker with a spread represented by the fractional Ambisonics order, wherein the fractional Ambisonics order is generated at least in part using the square route of $4\pi/\theta$ minus 1, wherein $\theta$ is the spread.

10. The apparatus of claim 9, wherein the instructions are executable to:
    execute Vector-Based Amplitude Panning (VBAP) to render the sound object.

11. The apparatus of claim 9, wherein the instructions are executable to execute AllRAD to play the sound object.

12. The apparatus of claim 9, wherein the instructions are executable to execute AllRAP to play the sound object.

13. The apparatus of claim 9, wherein the sound object comprises a first sound object in at least one computer game and the instructions are executable to:
    execute only Vector-Based Amplitude Panning (VBAP) to render a second sound object in the computer game.

14. A method comprising:
    identifying plural Ambisonics orders;
    for each Ambisonics order, solving a polynomial that interpolates known weights for integer orders on either side of a non-integer order to render interpolated weights;
    multiplying the interpolated weights with respective components of each Ambisonics order in the spherical harmonics domain; and
    using at least the interpolated weights to encode at least one sound object.

15. The method of claim 14, comprising:
    identifying the non-integer order at least in part based on a spread associated with the sound object.

16. The method of claim 14, wherein the weights comprise max-rE weights.

17. The method of claim 14, wherein the non-integer Ambisonics order is between $0^{th}$ and $5^{th}$ order Ambisonics.

18. The method of claim 15, comprising determining the non-integer Ambisonics order by taking the square root of $4\pi/\theta$ minus 1, wherein $\theta$ is the spread.

19. The method of claim 18, comprising executing spline interpolation at end regions of at least one of the polynomials.

\* \* \* \* \*